(12) United States Patent  
Dua et al.

(10) Patent No.: US 8,873,685 B2  
(45) Date of Patent: Oct. 28, 2014

(54) APPARATUS AND METHOD FOR MITIGATION OF RECEIVE POWER IMBALANCE ON EQUALIZER PERFORMANCE

(75) Inventors: Aditya Dua, San Diego, CA (US); Feng Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 13/190,326

(22) Filed: Jul. 25, 2011

(65) Prior Publication Data

US 2012/0134405 A1     May 31, 2012

Related U.S. Application Data

(60) Provisional application No. 61/417,418, filed on Nov. 27, 2010.

(51) Int. Cl.
*H04B 7/10* (2006.01)
*H04B 7/08* (2006.01)
*H04L 25/03* (2006.01)
*H04L 5/00* (2006.01)

(52) U.S. Cl.
CPC .... *H04B 7/0877* (2013.01); *H04L 2025/03414* (2013.01); *H04L 25/03891* (2013.01); *H04L 5/0023* (2013.01)
USPC ............ 375/347; 375/267; 375/316; 375/349

(58) Field of Classification Search
USPC ........................................ 375/346
See application file for complete search history.

(56) References Cited

U.S. PATENT DOCUMENTS

| 5,553,102 A * | 9/1996 | Jasper et al. .................. 375/347 |
| 6,185,266 B1 | 2/2001 | Kuchi et al. |
| 2004/0253955 A1 | 12/2004 | Love et al. |

FOREIGN PATENT DOCUMENTS

| EP | 1463215 A2 | 9/2004 |
| EP | 1953925 A1 | 8/2008 |
| EP | 2003794 A2 | 12/2008 |

OTHER PUBLICATIONS

International Search Report and Written Opinion—PCT/US2011/061894—ISA/EPO—May 2, 2012.
Qualcomm Europe: "On channel modeling for GERAN Receive Diversity", 3GPP Draft; GP-051550 RXDIV Channel Models (Jun. 14, 2005), 3rd Generation Partnership Project (3GPP), Mobile Competence Centre; 650, Route Des Lucioles; F-06921 Sophia-Antipolis Cedex ; France, vol. TSG GERAN, no. Montreal; 20050616, Jun. 16, 2005, XP050014315, [retrieved on Jun. 16, 2005].

* cited by examiner

*Primary Examiner* — Lihong Yu
(74) *Attorney, Agent, or Firm* — Linda G. Gunderson (57) ABSTRACT

An apparatus and method for mitigation of receive power imbalance including estimating input power levels on two diversity receive branches in a receiver; computing a power imbalance between the two diversity receive branches and determining a weaker receive branch; setting a weakRX parameter based on the weaker receive branch; computing an intercept parameter $c_0$ for a switching curve based on the weakRX parameter; computing a threshold T based on the intercept parameter; and determining a switching decision for the receiver based on the threshold T.

26 Claims, 10 Drawing Sheets

| PROCESSING BLOCK | TRUE NON-DIVERSITY/DIVERSITY SWITCHING | SWITCHING ALGORITHM (PROPOSED) |
|---|---|---|
| COMPUTATION OF EQUALIZER WEIGHTS | TWO SETS OF EQUALIZER TAPS ARE COMPUTED | ONE SET OF EQUALIZER TAPS IS COMPUTED |
| EQUALIZATION OF RECEIVED SAMPLES | RECEIVED SAMPLES ARE EQUALIZED TWICE (ONCE WITH EACH SET OF EQUALIZER TAPS) | RECEIVED SAMPLES ARE EQUALIZED ONCE |
| PILOT PROCESSING AND SNR ESTIMATION | TWO SETS OF PILOT SYMBOLS ARE PROCESSED AND SNR IS ESTIMATED FROM EACH SET OF SYMBOLS | ONE SET OF PILOT SYMBOLS IS PROCESSED AND ONE SNR IS ESTIMATED |
| SWITCHING BETWEEN NON-Rx DIVERSITY AND Rx DIVERSITY MODES | FILTER BOTH SETS OF SNR ESTIMATES | • FILTER SNR<br>• FILTER Rx IMBALANCE<br>• COMPARE FILTERED SNR WITH THRESHOLD AND MAKE SWITCHING DECISION |

APPARATUS AND METHOD FOR MITIGATION OF RECEIVE POWER IMBALANCE ON EQUALIZER PERFORMANCE

CLAIM OF PRIORITY UNDER 35 U.S.C. 119

The present application for patent claims priority to Provisional Application No. 61/417,418, entitled "APPARATUS AND METHOD FOR MITIGATION OF RECEIVED POWER IMBALANCE ON EQUALIZATION PERFORMANCE" filed Nov. 27, 2010, and assigned to the assignee hereof and hereby expressly incorporated by reference herein.

FIELD

This disclosure relates generally to apparatus and methods for improving equalizer performance in a wireless communications system. More particularly, the disclosure relates to mitigation of the impact of receive power imbalance on equalizer performance in a wireless communications system.

BACKGROUND

Wireless communication systems are widely deployed to provide various types of communication content such as voice, video, data, etc. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

In general, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

SUMMARY

Disclosed is an apparatus and method for mitigation of receive power imbalance, for example, on equalizer performance. According to one aspect, a method for mitigation of receive power imbalance including estimating input power levels on two diversity receive branches in a receiver; computing a power imbalance between the two diversity receive branches and determining a weaker receive branch; setting a weakRX parameter based on the weaker receive branch; computing an intercept parameter $c_0$ for a switching curve based on the weakRX parameter; computing a threshold T based on the intercept parameter; and determining a switching decision for the receiver based on the threshold T.

According to another aspect, an apparatus including a processor and a memory, the memory containing program code executable by the processor for performing the following: estimating input power levels on two diversity receive branches in a receiver; computing a power imbalance between the two diversity receive branches and determining a weaker receive branch; setting a weakRX parameter based on the weaker receive branch; computing an intercept parameter $c_0$ for a switching curve based on the weakRX parameter; computing a threshold T based on the intercept parameter; and determining a switching decision for the receiver based on the threshold T.

According to another aspect, an apparatus for mitigation of receive power imbalance including means for estimating input power levels on two diversity receive branches in a receiver; means for computing a power imbalance between the two diversity receive branches and determining a weaker receive branch; means for setting a weakRX parameter based on the weaker receive branch; means for computing an intercept parameter $c_0$ for a switching curve based on the weakRX parameter; means for computing a threshold T based on the intercept parameter; and means for determining a switching decision for the receiver based on the threshold T.

According to another aspect, a computer-readable medium storing a computer program, wherein execution of the computer program is for: estimating input power levels on two diversity receive branches in a receiver; computing a power imbalance between the two diversity receive branches and determining a weaker receive branch; setting a weakRX parameter based on the weaker receive branch; computing an intercept parameter $c_0$ for a switching curve based on the weakRX parameter; computing a threshold T based on the intercept parameter; and determining a switching decision for the receiver based on the threshold T.

Advantages of the present disclosure may include allowing optimized selection of receiver non-diversity/diversity modes and improved receiver performance.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
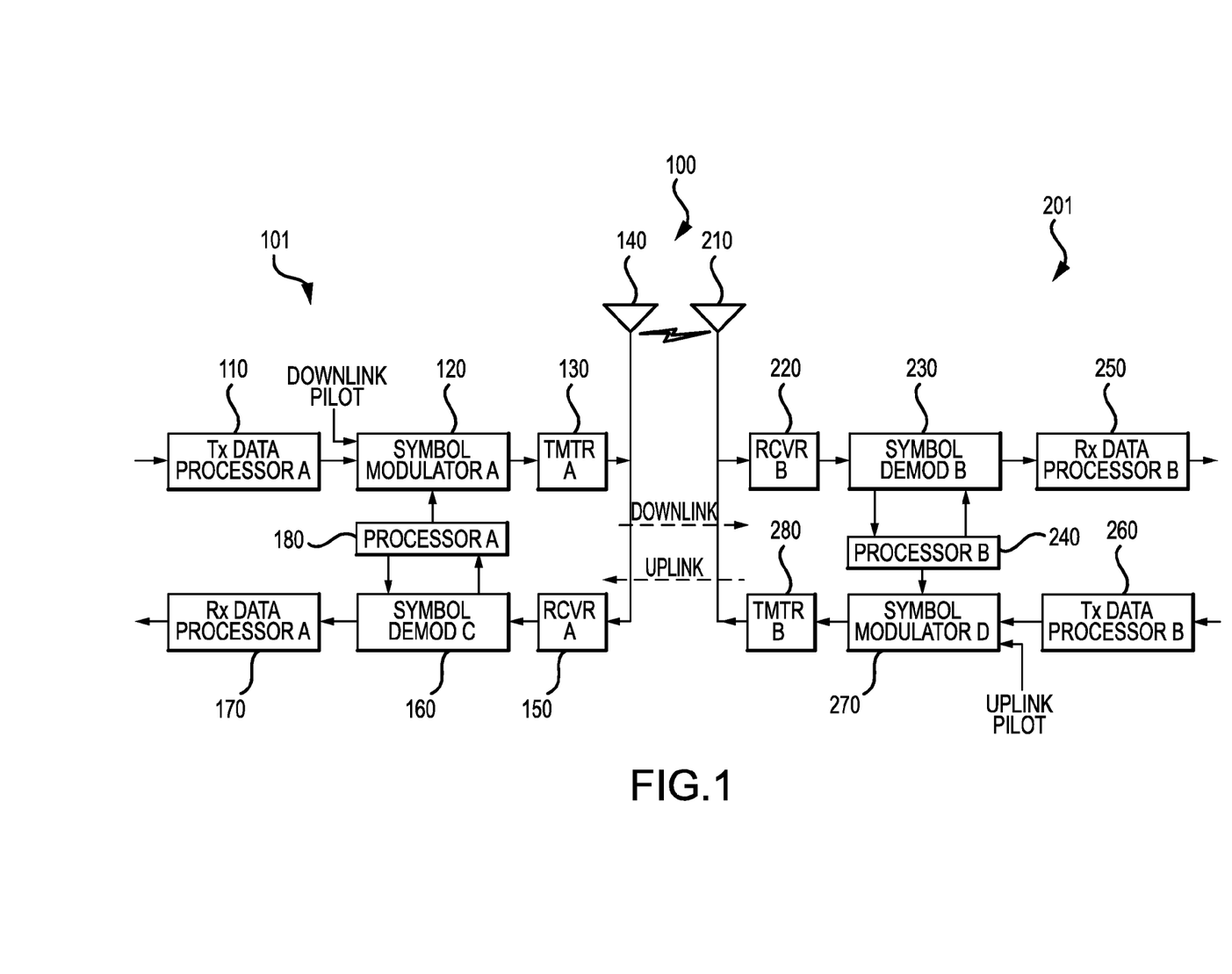
FIG. 1 illustrates an example block diagram depicting a wireless communication system.

FIG. 1 is a block diagram illustrating an example of a two terminal system 100. One skilled in the art would understand that the example two terminal system 100 illustrated in FIG. 1 may be implemented in an FDMA environment, an OFDMA environment, a CDMA environment, a WCDMA environment, a TDMA environment, a TD-SCDMA (Time Division Synchronous Code Division Multiple Access) environment, a SDMA (Space Division Multiple Access) environment or any other suitable wireless environment.

The two terminal system 100 includes an access node 101 (e.g., base station) and a user equipment or UE 201 (e.g., wireless communication device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the two terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
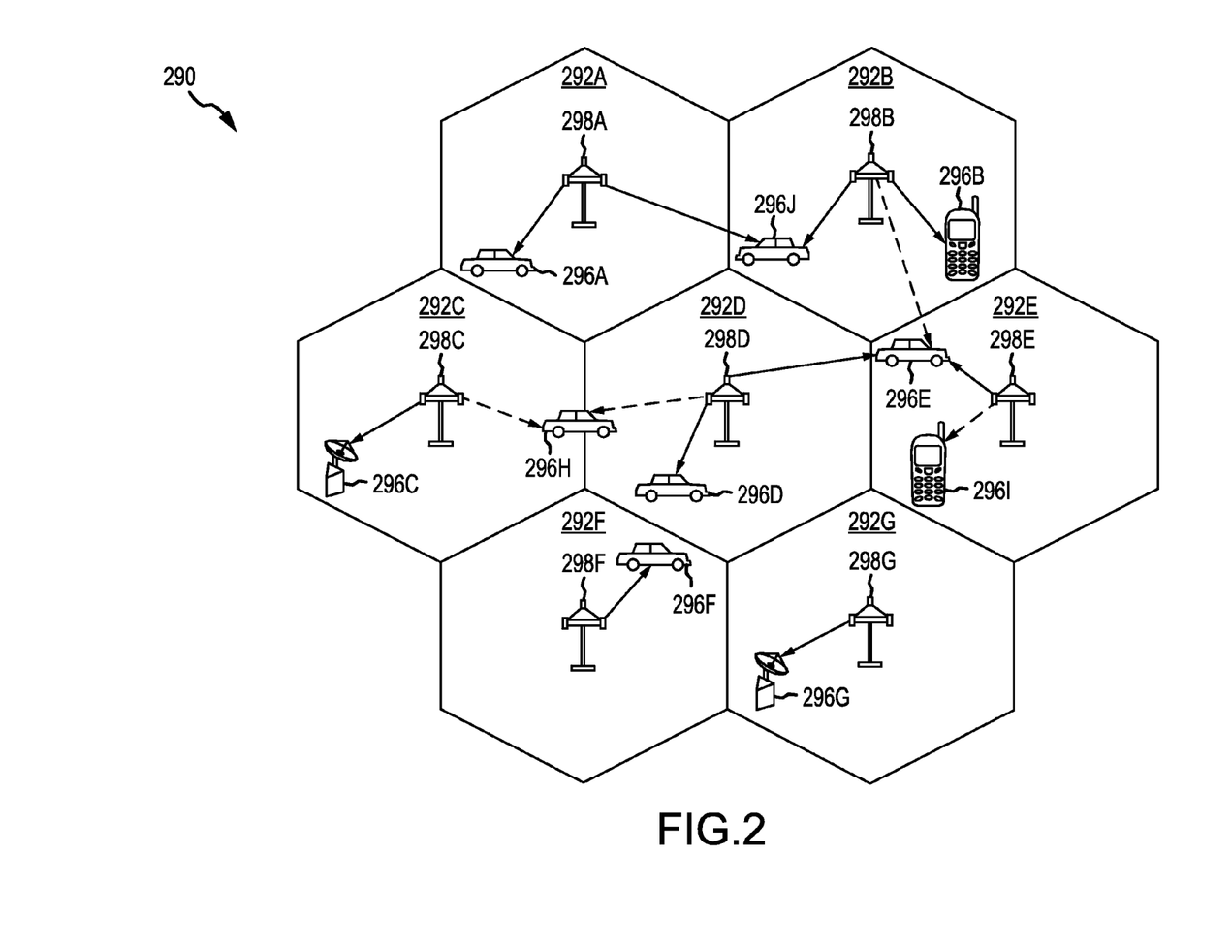
FIG. 2 illustrates an example of a wireless communication system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS), NodeBs or eNodeBs and reference numerals 296A to 296J refer to access user devices (a.k.a. user equipments (UEs)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

For purposes of the present disclosure, one or more of the following abbreviations may apply:

AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CoMP coordinated multi point
CP Cyclic Prefix
CRC Cyclic Redundancy Check
CTCH Common Traffic CHannel
DCCH Dedicated Control CHannel
DCH Dedicated CHannel
DCI Downlink Control Information
DL DownLink
DL-SCH Downlink shared channel
DSCH Downlink Shared CHannel
DTCH Dedicated Traffic Channel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
LTE Long Term Evolution
LTE-A LTE-Advanced or Long Term Evolution-Advanced
MAC Medium Access Control
MBMS Multimedia Broadcast Multicast Service
MBSFN Multicast Broadcast Single Frequency Network
MCE MBMS coordinating entity
MCCH MBMS point-to-multipoint Control CHannel
MCH Multicast Channel
MRW Move Receiving Window
MSB Most Significant Bit
MSCH MBMS point-to-multipoint Scheduling Channel or MBMS control channel
MTCH MBMS point-to-multipoint Traffic CHannel
PBCH Physical Broadcast CHannel
PCCH Paging Control CHannel
PCH Paging CHannel
PCFICH Physical Control Format Indicator Channel PDCCH Physical Downlink Control Channel
PDSCH Physical Downlink Shared Channel
PDU Protocol Data Unit
PHICH Physical Hybrid ARQ Indicator CHannel
PHY PHYsical layer
PhyCHPhysical Channels
PMCH Physical Multicast Channel
PRACH Physical Random Access Channel
PUSCH Physical Uplink Shared Channel
PUCCH Physical Uplink Control Channel
RACH Random Access CHannel
RLC Radio Link Control
RRC Radio Resource Control
RNTI radio network temporary identifier
SAP Service Access Point
SDU Service Data Unit
SHCCH SHared channel Control CHannel
SN Sequence Number
SNR signal-to-noise ratio
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network LTE-Advanced (LTE-A) is a wireless technology evolution in the UMTS protocol family. Desired goals for LTE-A systems include enhanced data rates, up to 1 Gb/s on the downlink, for example. In addition, deployment of LTE-A wireless systems must be backward-compatible with LTE systems to preserve the financial investments made in the preceding LTE infrastructure. Furthermore, a goal for LTE-A systems is improved spectral efficiency, that is, a higher data throughput per unit bandwidth, expressed in bits per second per Hertz (bps/Hz). Improved spectral efficiency is vital to the growth of the wireless communication industry since the available spectral resources for wireless transmission are severely limited and tightly regulated worldwide.

In the present disclosure the first deployment of LTE will be referred to as LTE Release 8 (Rel-8). The modified LTE version is known as LTE Release 9 (Rel-9). A subsequent upgrade of LTE Release 8/9 is referred to, in the present disclosure, as either LTE-Advanced (LTE-A) or LTE Rel-10+. In the present disclosure, the "10+" reference denotes a "Release 10" version or a later version. One skilled in the art would understand that the scope and spirit of the present disclosure is applicable to future upgrades of LTE with the applicable characteristics described herein, regardless of the name assigned to any future upgrade versions.

One proposed feature in LTE-A is known as carrier extension. In this aspect, individual component carriers may be extended to provide a wider bandwidth, up to, for example, 100 MHz. In one aspect, user equipment (UE) compatible with LTE-A may have a different allocation of system bandwidth than UEs compatible only with LTE Rel-8 due to the usage of carrier extension. Resource assignments and other control data for the LTE Rel-8 or LTE-A downlinks are carried in a message known as the Downlink Control Information (DCI).

In many telecommunication systems, communications networks are used to exchange messages among several interacting spatially-separated devices. The various types of networks may be classified in different aspects. In one example, the geographic scope of the network may be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

In one example, wireless networks are compatible with various wireless protocols. Exemplary versions of wireless protocols include Universal Mobile Telecommunications System (UMTS), High Speed Downlink Packet Access (HSDPA), High Speed Uplink Packet Access (HSUPA), Long Term Evolution (LTE), etc. Wireless systems compliant with these protocols are used for various communication services such as telephony, messaging, data transfer, emails, Internet access, audio broadcasts, video communications, etc. These wireless systems generally utilize an access node (AN), also known as base station (BS) or Node B, to connect to an individual access terminal (AT), also known as user equipment (UE) or user device, to fixed telecommunications infrastructure networks. In general, a radio coverage area is implemented using a plurality of NodeBs or eNodeBs using a cellular-based topological architecture to provide wireless access, also known as an air interface, to the UEs (e.g., user devices). Examples of fixed telecommunications infrastructure networks include the public switched telephony network (PSTN), Internet, private data networks, etc. In one aspect, the NodeBs or eNodeBs may be connected to a Radio Network Controller (RNC) to facilitate the interconnection to the fixed telecommunications infrastructure networks.

LTE is an evolution of the UMTS wireless communication standard developed by the Third Generation Partnership Project (3GPP), commencing with Release 8 (Rel-8) of the UMTS protocol family. The LTE physical layer is based on orthogonal frequency division multiplex (OFDM) on the downlink, i.e., from base station, NodeBs or eNodeB to user equipment (UE) and single carrier frequency division multiple access (SC-FDMA) on the uplink, i.e. from the UE to the base station or eNodeB. LTE may also accommodate multiple input multiple output (MIMO) antenna techniques for improved spectral efficiency.

LTE-Advanced (LTE-A) is a further evolution of LTE, currently slated for UMTS Release 10 (Rel-10). LTE-A includes various system enhancements to improve system performance such as cellular coverage, system throughput, quality of service (QoS), etc. One improvement is the usage of relays in the LTE air interface to provide extended radio coverage for more users. In one aspect, relays are used to minimize the distance between a transmitter and a receiver to enable higher data rates or improved communications performance. In another aspect, there are several relay architectural alternatives. For example, one form of relay is known as a layer 3 relay or a self-backhaul which effectively appears as another base station or eNodeB to a UE connected to it. Note that "layer 3" refers to the well-known open systems interconnection (OSI) protocol stack model, where layer 3 is also referred to as the "network layer".

In one aspect, a signal model in an additive white Gaussian noise (AWGN) channel for a receiver with diversity may be constructed as follows:

$$y_0 = x + n_0$$

$$y_1 = x + n_1$$

where $n_0$, $n_1$ are zero mean circularly symmetric Gaussian random variables with variances $\sigma_0^2$ and $\sigma_1^2$ respectively, x is the transmitted signal, and $y_0$, $y_1$ are the received signals on the two Rx branches, respectively. In one aspect, the signal model includes unequal noise variances on the two Rx branches to model different carrier-to-noise ratio (C/N) values. For example, a Rx branch with lower power will have a lower C/N value and hence a larger noise variance in this model. In one example, a linear receiver structure with weighting coefficients $c_o$ and $c_1$ may be implemented by the following equation:

$$x_{est} = c_0 y_0 + c_1 y_1$$

where $x_{est}$ is the estimate of the transmitted signal at the receiver.

In another aspect, an output signal-to-noise ratio (SNR) $\gamma$ may be defined as:

$$\gamma = (|c_0 + c_1|^2)/(|c_0|^2 \sigma_0^2 + |c_1|^2 \sigma_1^2)$$

For example, the weighting coefficients $c_0$, $c_1$ may be selected according to a variety of criteria. In one example, pilot weighted combining (PWC) may be applied by selecting the weighting coefficients $c_0 = c_1 = \frac{1}{2}$ so that $\gamma = 4/(\sigma_0^2 + \sigma_1^2)$. In another example, maximal ratio combining (MRC) may be applied by selecting the weighting coefficients $c_0 = 1/\sigma_0^2$ and $c_1 = 1/\sigma_1^2$ so that $\gamma = 1/\sigma_0^2 + 1/\sigma_1^2$. In yet another example, minimum mean square error (MMSE) combining may be applied by selecting the weighting coefficients according to:

$$\begin{bmatrix} c_0 \\ c_1 \end{bmatrix} = R_{yy}^{-1} R_{xy} = \begin{bmatrix} 1 + \sigma_0^2 & 1 \\ 1 & 1 + \sigma_1^2 \end{bmatrix}^{-1} \begin{bmatrix} 1 \\ 1 \end{bmatrix}$$

so that $\gamma = 1/\sigma_0^2 + 1/\sigma_1^2$. In another example, no receive diversity may be applied by selecting the weighting coefficients $c_0 = 1$ and $c_1 = 0$ so that $\gamma = 1/\sigma_0^2$. In another aspect, in a power imbalance scenario, if the power imbalance $\sigma_1^2/\sigma_0^2 > 4.77$ dB, PWC is worse than no receive diversity. In one example, theoretically, MRC=MMSE>no diversity, regardless of the power imbalance level. In another example, for zero power imbalance, the receivers are identical and give a 3 dB gain over a non-diversity receiver.

In one example, a matrix which is inverted to compute MMSE taps may be nearly singular in a high geometry scenario. For example, the determinant may be expressed as $\sigma_0^2 + \sigma_1^2 + \sigma_0^2 \sigma_1^2$. In one example, for diversity mode, the covariance may be conditioned prior to computing the MMSE weights. For example, in an additive white Gaussian noise (AWGN) scenario, the MMSE weights may be computed as $$\delta = a(2 + \sigma_0^2 + \sigma_1^2) \text{ for } a < 1$$

$$\begin{bmatrix} c_0 \\ c_1 \end{bmatrix} = (R_{yy} + \Delta 1)^{-1} R_{xy} = \begin{bmatrix} 1 + \sigma_0^2 + \delta & 1 \\ 1 & 1 + \sigma_1^2 + \delta \end{bmatrix}^{-1} \begin{bmatrix} 1 \\ 1 \end{bmatrix}$$

In one example, one may add a fraction of the trace to the diagonal of the above matrix. For example, one may set a conditioning parameter a=0.125.

Figure 3:
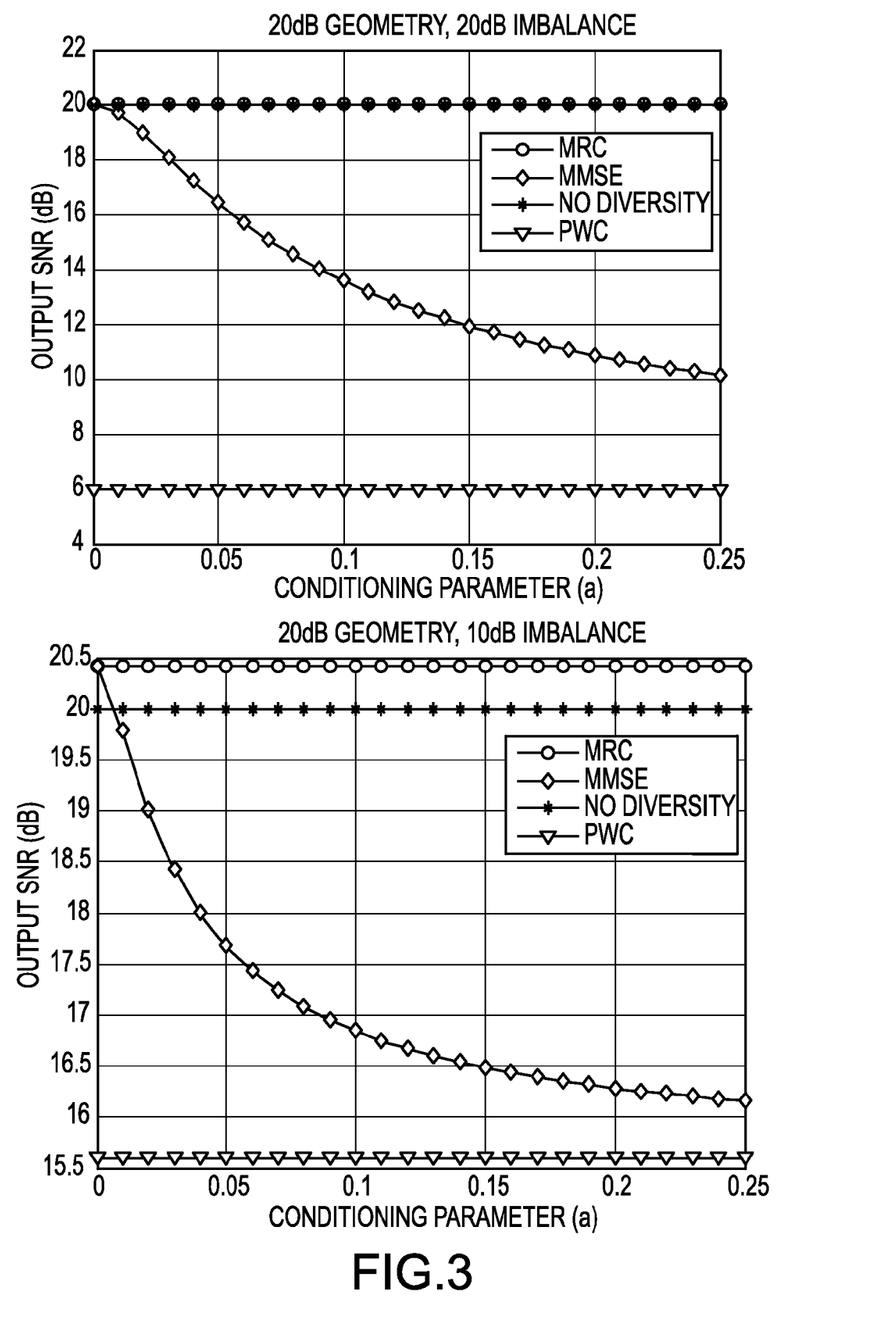
FIG. 3 illustrates an example of a comparison of weighting criteria for output signal-to-noise ratio (SNR) versus a conditioning parameter.

FIG. 3 illustrates an example of a comparison of weighting criteria for output signal-to-noise ratio (SNR) versus a conditioning parameter. Shown in FIG. 3 are two plots of output SNR vs. conditioning parameter (a) for two different imbalance scenarios.

In one aspect, the performance of an equalizer with receiver diversity (i.e., a diversity receiver or type 3 receiver) is adversely impacted if the received powers on the primary and diversity RF chains are imbalanced. In some scenarios, the performance of the diversity receiver may be worse than that of the non-diversity receiver (i.e., equalizer with no receiver diversity or type 2 receiver), thereby negating the benefits of having a UE which supports equalizer with receiver diversity. This performance aspect has been corroborated through simulations as well as from field measurements.

Figure 4:
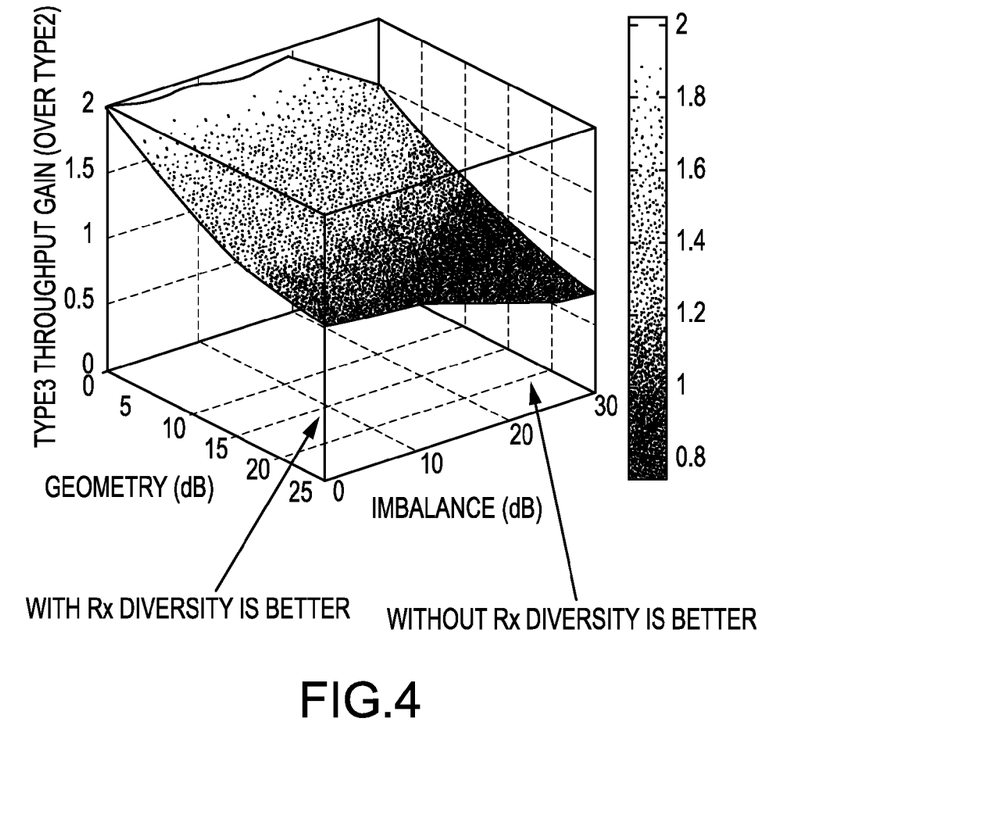
FIG. 4 illustrates an example of a diversity receiver throughput gains over a non-diversity receiver as a function of geometry and Rx power imbalance.

FIG. 4 illustrates an example of a diversity receiver throughput gains over a non-diversity receiver as a function of geometry and Rx power imbalance. As an illustration, the throughput gains of a diversity receiver vis-à-vis a non-diversity receiver (e.g. for the ITU Pedestrian A (PA3) channel profile) for different received power imbalances and geometries are depicted in FIG. 4. In this example, it is shown that the diversity receiver underperforms the non-diversity receiver in high geometry conditions by as much as 20% when there is a large power imbalance between the primary and diversity RF chains.

In one example, the performance degradation in the presence of power imbalance arises from the fact that the Carrier-to-Noise (C/N) Ratio offered by an RF chain decreases as the received power decreases, especially in the low power regime. Thus, more thermal noise are injected into the received signal at the receive antenna with the lower received power. This may cause degradation in performance when the signals from the two receive antennas are combined. In one aspect, the degradation is more visible in high geometry scenarios, where thermal noise becomes the dominant noise source. If the noise level on the receive antenna with the lower received power becomes excessive, in one example, it may be better to discard the signal from the weaker antenna completely and use the signal from the stronger antenna alone for demodulation.

In one aspect, the present disclosure discloses dynamically switching between non-diversity and diversity modes of operation as an approach to mitigate the imbalance problem. In a diversity mode of operation, the UE jointly equalizes the received signals from both receive antennas. In contrast, in a non-diversity mode of operation, the UE only equalizes the signal received on the stronger antenna of the two receive antennas.

In one example, the common pilot channel (CPICH) signal-to-noise ratio (SNR), estimated by the UE for the purpose of channel quality indicator (CQI) reporting, the power imbalance between the two RF chains, and the received power level observed at the stronger receive antenna (the latter two are available from received signal code power (RSCP) measurements) are jointly used as criteria to switch from diversity mode to non-diversity mode, and vice-versa. For example, the switching decision is based on a set of parameterized affine switching curves computed offline via simulations.

Figure 5:
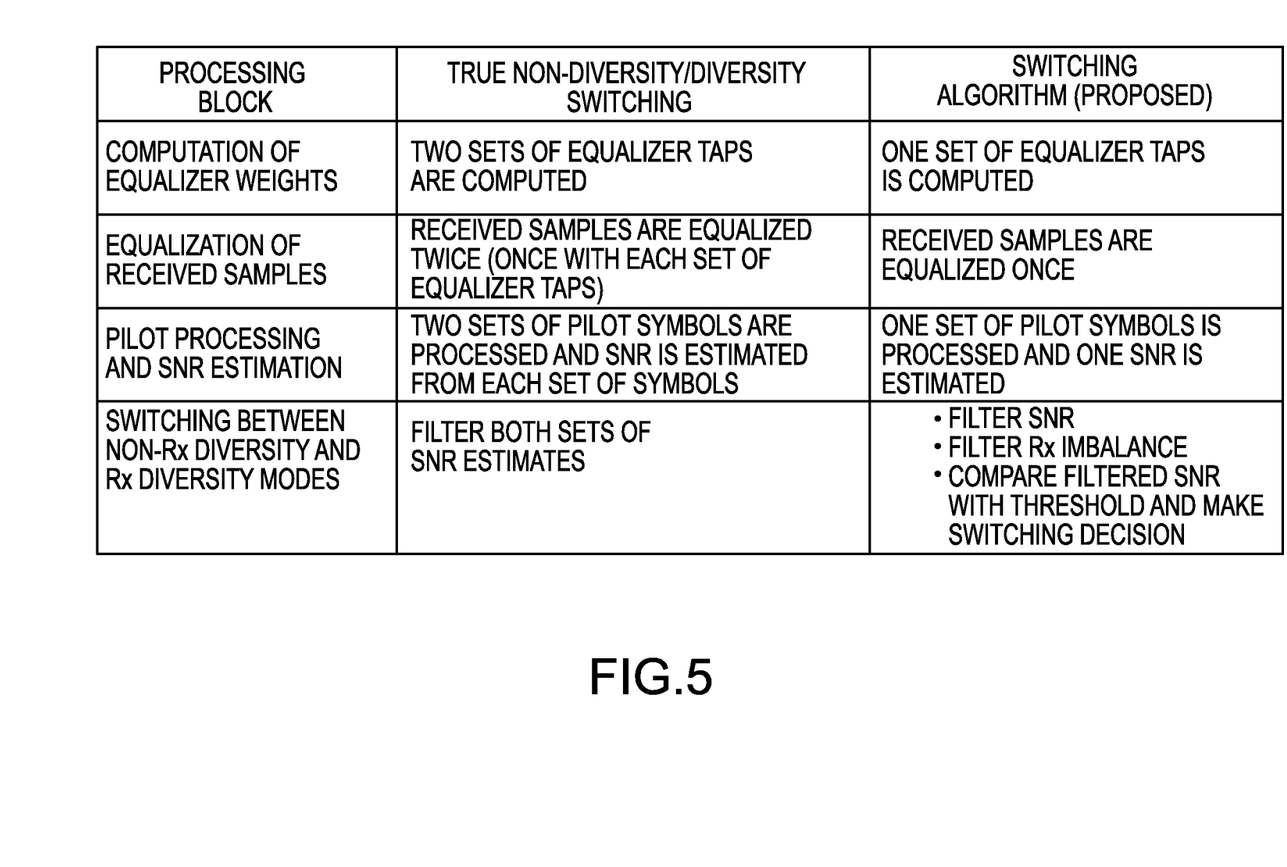
FIG. 5 illustrates an example of a complexity comparison of true non-diversity/diversity switching and a switching algorithm.

In one aspect, a key motivation for considering a switching algorithm based on switching curves computed offline is to keep the real-time complexity of the algorithm as low as possible. The low complexity of the proposed algorithm may be an important factor because the complexity of doing "true" switching based on concurrent real-time SNR measurements for non-diversity and diversity modes of operation can be prohibitive. Supporting "true" switching may impose a significant processing load expressed in millions of instructions per second (MIPS) or hardware cycles and memory overhead for almost all components of the data path, e.g., equalizer weight computation, equalization, and SNR estimation. FIG. 5 illustrates an example of a complexity comparison of true non-diversity/diversity switching and a switching algorithm (proposed). A comparison of the overhead imposed by the true non-diversity/diversity switching vis-à-vis the proposed switching algorithm is depicted in FIG. 5.

In one aspect, a non-diversity/diversity mode dynamic switching algorithm relies on a family of parametric affine switching curves computed offline via the simulations. For example, the switching curve based approach does not require concurrent support for non-diversity and diversity modes of operation, i.e., only one of the two modes is active at any given time. As a result, the algorithm imposes minimal additional computational complexity, for example, in terms of firmware MIPS or hardware cycles.

Each switching curve in the family of switching curves is characterized by two parameters, for example, the slope and the intercept. In one aspect, while the slope parameter is identical for all curves, the intercept parameter depends on the received power on the stronger of the two receive antennas. Thus, the family of switching curves includes a set of parallel straight lines with different intercepts.

Figure 6:
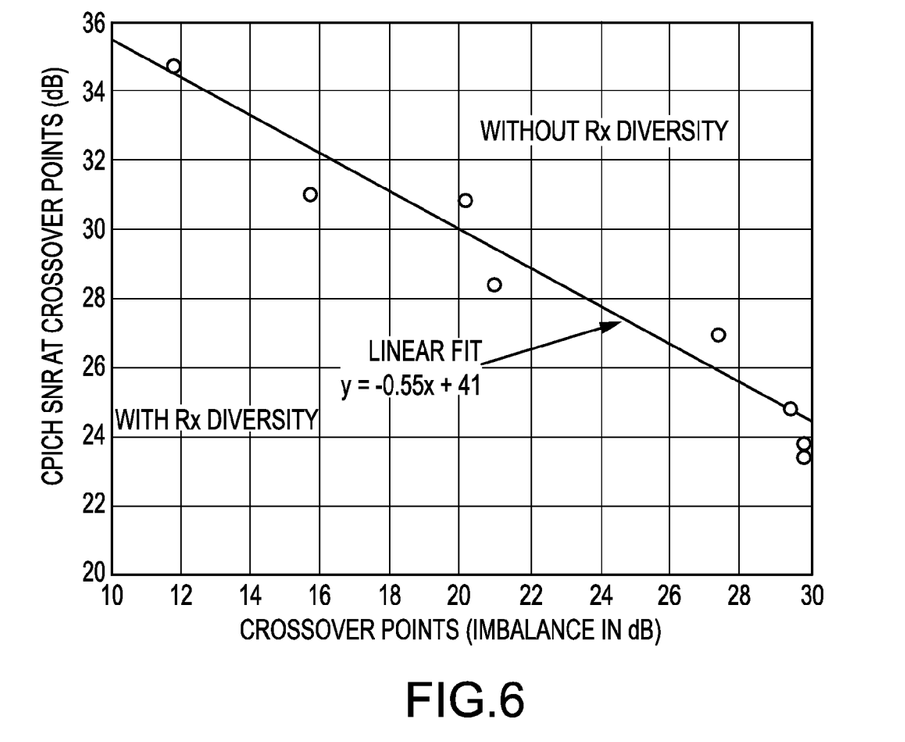
FIG. 6 illustrates an example of a switching curve corresponding to a received power of −70 dBm on the stronger antenna.

FIG. 6 illustrates an example of a switching curve corresponding to a received power of −70 dBm on the stronger antenna. One skilled in the art would understand that the received power of −70 dBm illustrated herein is merely representative and any other value chosen for a particular implementation may be used without affecting the scope or spirit of the present disclosure. In one aspect, a switching curve is a curve which splits the observation space into two halves or decision regions. Given two possible decisions, for example $D_0$ and $D_1$, choose decision $D_0$ in one half and choose decision $D_1$ in the other half in one aspect. In this context, the observation space is a two-dimensional plane of CPICH SNR and Rx power imbalance, and decision $D_0$ corresponds to selecting non-diversity mode of operation, and decision $D_1$ corresponds to selecting diversity mode of operation.

In one aspect, a non-diversity/diversity mode switching algorithm may be constructed as follows. The following inputs to the switching algorithm may be computed offline, i.e. statically, for example, via simulations:

Switching curve slope $c_1$ (common to all curves)

Switching curve nominal intercept $c_0^*$ (for input power=−70 dBm)

Switching curve intercept offset $\mu$, used to compute the switching curve intercept when input power≠−70 dBm In another aspect, the following inputs to the switching algorithm are computed dynamically:

Estimates of input power levels (in dBm) on both RF chains ($r_0$ and $r_1$, respectively).

Estimate of CPICH SNR $\gamma$ at the output of the equalizer

In one example, at the beginning of every equalizer update period, perform the following steps:

Update filter states:

$R_0'=(1-\alpha)R_0+\alpha r_0$—filtered received power on Rx0 branch $R_1'=(1-\alpha)R_1+\alpha r_1$—filtered received power on Rx1 branch $\Gamma'=(1-\alpha)\Gamma+\alpha\gamma$—filtered CPICH SNR where $R_0$=current filtered received power on Rx0 branch, $R_0'$=updated filtered received power on Rx0 branch, $R_1$=current filtered received power on Rx1 branch, $R_1'$=updated filtered received power on Rx1 branch, $\alpha$=filter parameter, $r_0$=input power estimate on Rx0 branch, $r_1$=input power estimate on Rx1 branch, $\gamma$=CPICH SNR estimate, $\Gamma$=current filtered CPICH SNR, $\Gamma'$=updated filtered CPICH SNR.

Compute a receive power imbalance and determine a weaker receive branch:

If $R_0'>R_1'$, $\Delta=R_0'-R_1'$, weakRx=1

If $R_0'\leq R_1'$, $\Delta=R_1'-R_0'$, weakRx=0

Compute an intercept for the switching curve:

If weakRx=1, $c_0=c_0^*+\mu(R_0'+70)$

If weakRx=0, $c_0=c_0^*+\mu(R_1'+70)$

Compute a SNR threshold T:

$T=c_0+c_1\Delta$,

Make a switching decision:

If current mode is diversity and $\Gamma'\leq T$, do nothing

If current mode is diversity and $\Gamma'>T$, switch to non-diversity mode

If weakRx=1, set equalizer taps for Rx0 to zero

If weakRx=0, set equalizer taps for Rx1 to zero

If current mode is non-diversity and $\Gamma'>T$, do nothing

If current mode is non-diversity and $\Gamma'\leq T$, switch to diversity mode

Figure 7:
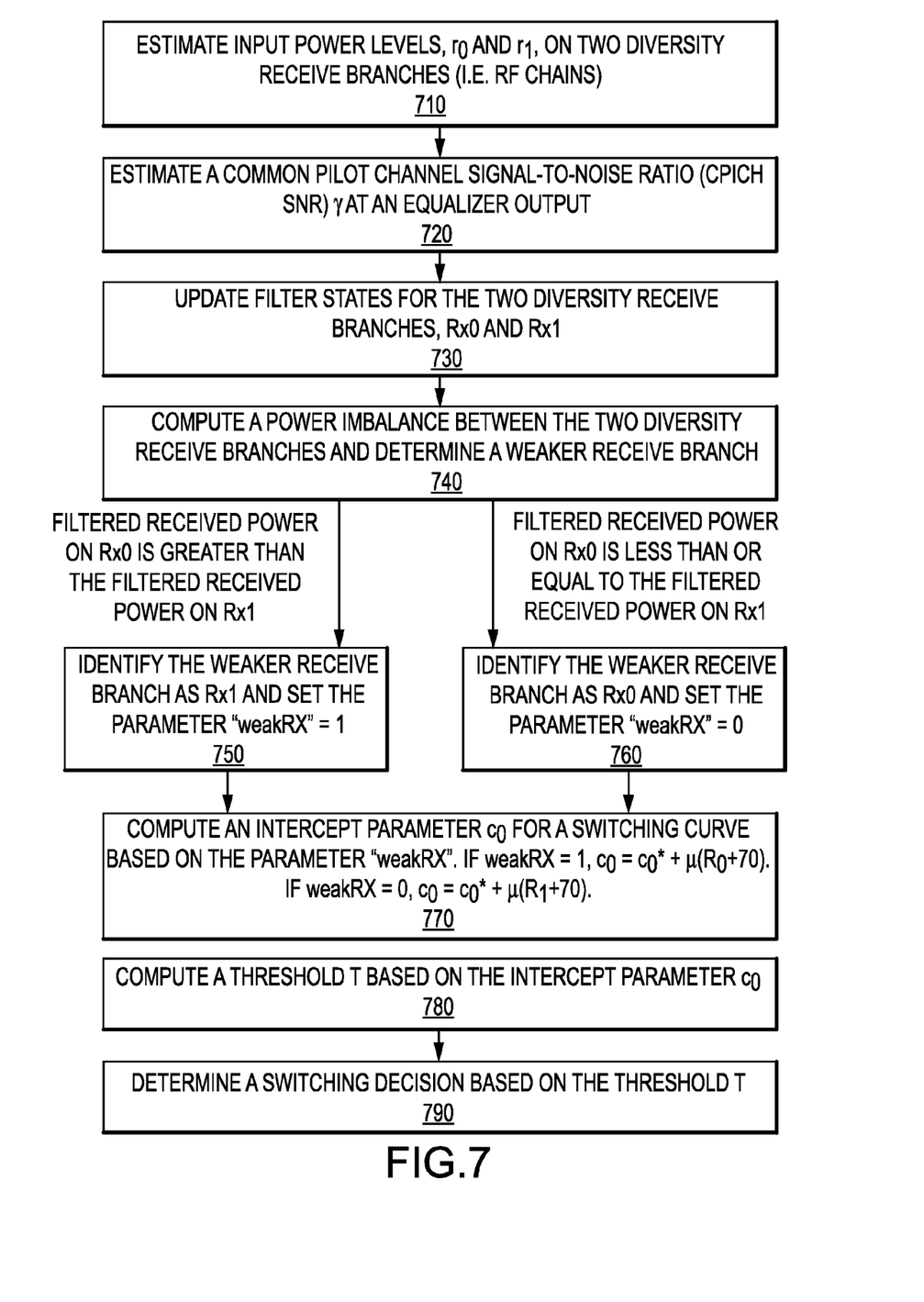
FIG. 7 illustrates an example of a flow diagram for a non-diversity/diversity mode switching algorithm in accordance with the present disclosure.

FIG. 7 illustrates an example of a flow diagram for a non-diversity/diversity mode switching algorithm. In one aspect, the flow illustrated in FIG. 7 is for mitigation of receive power imbalance on equalizer performance. That is, for example, for mitigation of degradation in the performance of an equalizer receiver with receive diversity due to receive power imbalance. In block 710, estimate input power levels, $r_0$ and $r_1$, on two diversity receive branches (i.e. RF chains). In block 720, estimate a common pilot channel signal-to-noise ratio (CPICH SNR) $\gamma$ at an equalizer output. In block 730, update filter states for the two diversity receive branches, Rx0 and Rx1, for example, by generating updated filter states based on the estimated input power levels and current filter states. In one example, compute an updated filtered received power on Rx0 and an updated filtered received power on Rx1. In another example, compute a filtered CPICH SNR Γ. In block 740, compute a power imbalance based on the updated filtered received power between the two diversity receive branches and determine a weaker receive branch. If the filtered received power on Rx0 is greater than the filtered received power on Rx1, proceed to block 750 and identify the weaker receive branch as Rx1 and set a parameter "weakRX"=1. The parameter "weakRX" may also be referred to as weakRX parameter. If the filtered received power on Rx0 is less than or equal to the filtered received power on Rx1, proceed to block 760 and identify the weaker receive branch as Rx0 and set the parameter "weakRX"=0. In either case, proceed to block 770 and compute an intercept parameter $c_0$ for a switching curve based on the parameter "weakRX". If weakRX=1, $c_0 = c_0^* + \mu(R_0 + 70)$. Alternatively, if weakRX=0, $c_0 = c_0^* + \mu(R_1 + 70)$. In block 780, compute a SNR threshold T based on the intercept parameter. In one example, $T = c_0 + c_1 D$. In block 790, determine a switching decision based on the SNR threshold. In one example, if the current receiver mode is diversity and $\Gamma \leq T$, do nothing. If the current receiver mode is diversity and $\Gamma > T$, switch to non-diversity receiver mode. In one example, if weakRx=1, set equalizer taps for Rx0 to zero and if weakRx=0, set equalizer taps for Rx1 to zero. If the current receiver mode is non-diversity and $\Gamma > T$, do nothing. If the current receiver mode is non-diversity and $\Gamma \leq T$, switch to diversity receiver mode. Γ is a current filtered common pilot channel signal-to-noise ratio (CPICH SNR).

Figure 8:
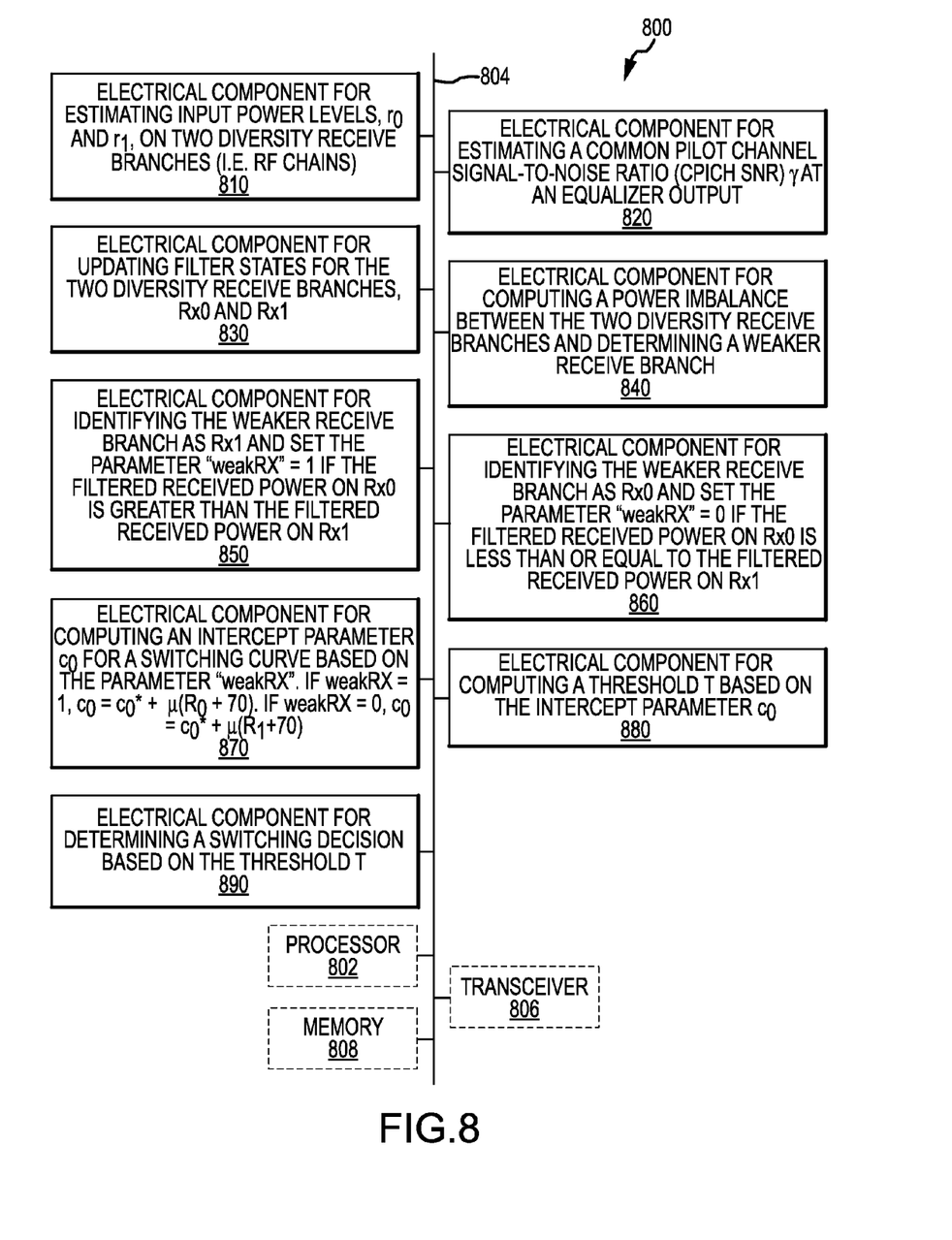
FIG. 8 illustrates an example device for mitigation of receive power imbalance, for example, on equalizer performance.

FIG. 8 illustrates an example device 800 for mitigation of receive power imbalance, for example, on equalizer performance. The device 800 may be configured as a communication device or as a processor or similar device for use within the communication device. As depicted, device 800 may include functional blocks that can represent functions implemented by a processor, software, hardware or combination thereof (e.g., firmware).

As illustrated, device 800 may include an electrical component 810 for estimating input power levels, $r_0$ and $r_1$, on two diversity receive branches (i.e. RF chains). The device 800 may include an electrical component 820 for estimating a common pilot channel signal-to-noise ratio (CPICH SNR) γ at an equalizer output. The device 800 may include an electrical component 830 for updating filter states for the two diversity receive branches, Rx0 and Rx1, for example, by generating updated filter states based on the estimated input power levels and current filter states. The device 800 may include an electrical component 840 for computing a power imbalance based on the updated filtered received power between the two diversity receive branches and determine a weaker receive branch. If the filtered received power on Rx0 is greater than the filtered received power on Rx1, enabled the electrical component 850. If the filtered received power on Rx0 is less than or equal to the filtered received power on Rx1, enabled the electrical component 860.

The device 800 may include an electrical component 850 for identifying the weaker receive branch as Rx1 and setting a parameter "weakRX"=1. The device 800 may include an electrical component 860 for identifying the weaker receive branch as Rx0 and setting the parameter "weakRX"=0. The device 800 may include an electrical component 870 for computing an intercept parameter $c_0$ for a switching curve based on the parameter "weakRX". The device 800 may include an electrical component 880 for computing a SNR threshold T based on the intercept parameter. In one example, $T = c_0 + c_1 D$. The device 800 may include an electrical component 890 for determining a switching decision based on the SNR threshold.

Device 800 may optionally include a processor module 802 having at least one processor. In one aspect, device 800 may be configured as a communication network entity, rather than as a processor. Processor 802, in such case, may be in operative communication with electrical components 810-890 via a bus 804 or a similar communication coupling. Processor 802 may effect initiation and scheduling of the processes or functions performed by electrical components 810-890.

In related aspects, device 800 may include a transceiver module 806. A stand-alone receiver and/or stand-alone transmitter may be used in lieu of or in conjunction with transceiver module 806. In further related aspects, device 800 may optionally include a module for storing information, such as, for example, a memory module 808. The memory module 808 may include a computer readable medium and may be operatively coupled to the other components of device 800 via a bus 804 or the like. The memory module 808 may be adapted to store computer readable codes, instructions and/or data for effecting the processes and behavior of electrical components 810-890, and subcomponents thereof, or processor 802, or the methods disclosed herein. Memory module 808 may retain codes/instructions for executing functions associated with electrical components 810-890. While shown as being external to memory module 808, it is to be understood that electrical components 810-890 may exist within memory module 808.

One skilled in the art would understand that the steps disclosed in the example flow diagram in FIG. 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
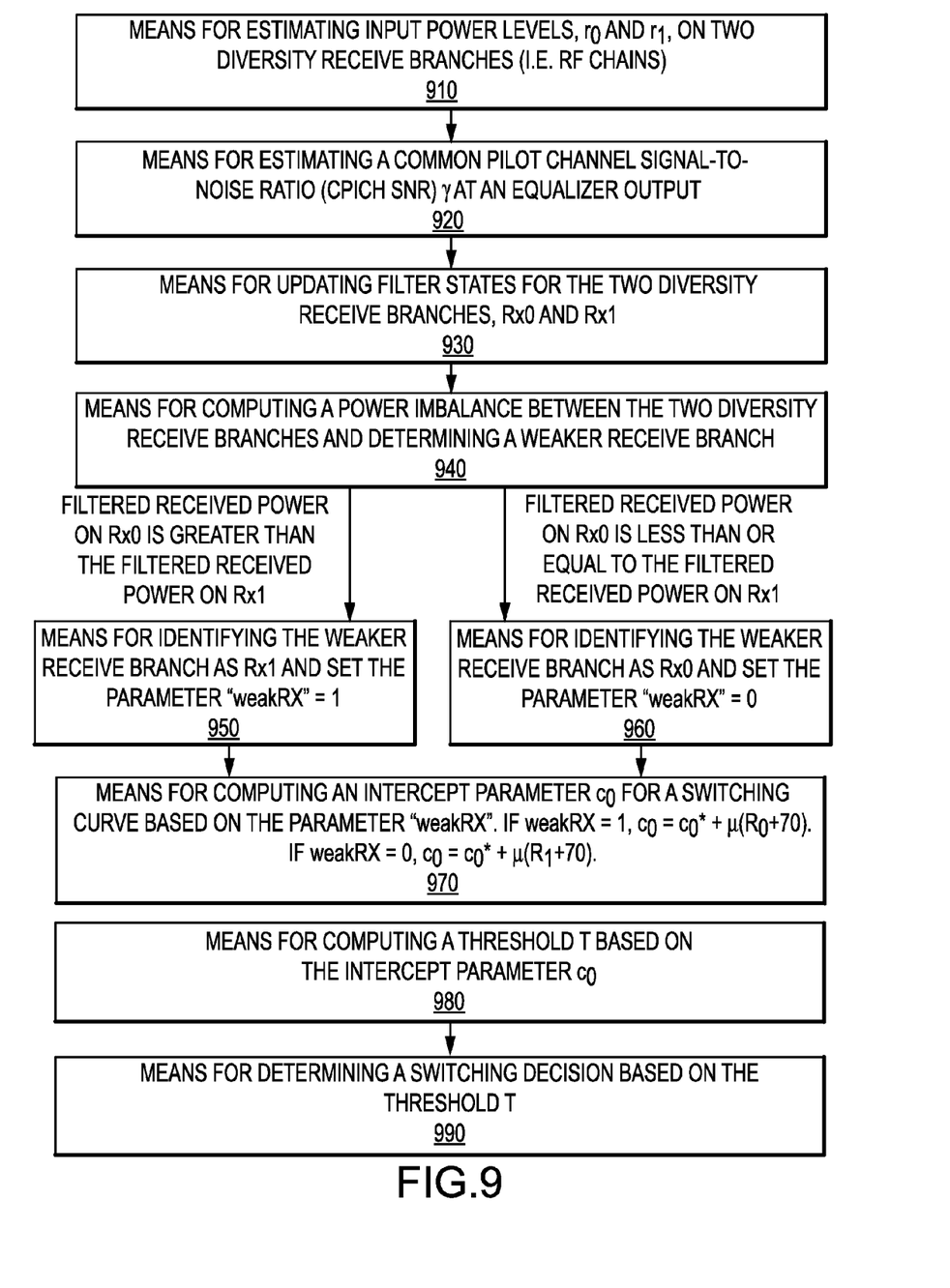
FIG. 9 illustrates an example of another device suitable for mitigation of receive power imbalance, for example, on equalizer performance.

FIG. 9 illustrates an example of another device 900 suitable for mitigation of receive power imbalance, for example, on equalizer performance. In one aspect, the device 900 is implemented by at least one processor including one or more modules configured to provide different aspects of mitigation of receive power imbalance, for example, on equalizer performance as described herein in blocks 910, 920, 930, 940, 950, 960, 970, 980 and 990. For example, each module includes hardware, firmware, software, or any combination thereof. In one aspect, the device 900 is also implemented by at least one memory in communication with the at least one processor.

Figure 10:
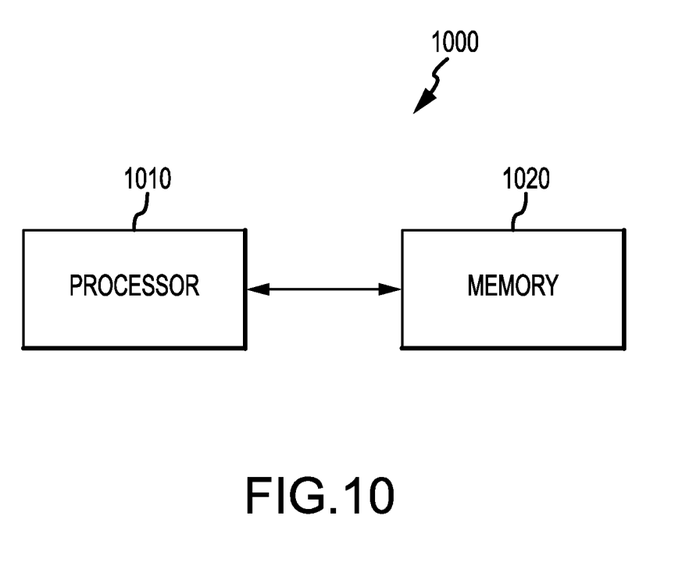
FIG. 10 illustrates an example of a device including a processor in communication with a memory for executing the processes for mitigation of receive power imbalance, for example, on equalizer performance.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 10 illustrates an example of a device 1000 including a processor 1010 in communication with a memory 1020 for executing the processes for mitigation of receive power imbalance, for example, on equalizer performance. In one example, the device 1000 is used to implement the algorithm illustrated in FIG. 7. In one aspect, the memory 1020 is located within the processor 1010. In another aspect, the memory 1020 is external to the processor 1010. In one aspect, the processor includes circuitry for implementing or performing the various flow diagrams, logical blocks and/or modules described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for mitigation of receive power imbalance comprising:
   estimating received power levels on a first diversity receive branch and a second diversity receive branch in a receiver;
   updating filter states of the first diversity receive branch and the second diversity receive branch based on estimated received power levels and current filter states;
   determining a threshold T based on a power imbalance between the first diversity receive branch and the second diversity receive branch;
   determining the power imbalance between the first diversity receive branch and the second diversity receive branch based on updated filtered received power levels on the first diversity receive branch and the second diversity receive branch;
   determining a weaker receive branch, wherein the weaker receive branch has lower updated filtered received power levels between the first diversity receive branch and the second diversity receive branch;
   determining an intercept parameter for a switching curve, wherein the intercept parameter for the switching curve is indicative of updated filtered received power levels of the second diversity receive branch if the first diversity receive branch is the weaker receive branch; and
   determining a switching decision for the receiver based on the threshold T.

2. The method of claim 1 further comprising setting an equalizer tap value of zero for the weaker receive branch.

3. The method of claim 1 further comprising estimating a signal-to-noise ratio (SNR) at an equalizer output.

4. The method of claim 3, wherein the SNR is a common pilot channel signal-to-noise ratio (CPICH SNR).

5. The method of claim 4, wherein if a mode of the receiver is diversity and an updated filtered CPICH SNR is less than or equal to the threshold T, maintain the mode as diversity.

6. The method of claim 4, wherein if the mode of the receiver is diversity and an updated filtered CPICH SNR is greater than the threshold T, switch the mode to non-diversity.

7. The method of claim 4, wherein if the mode of the receiver is non-diversity and an updated filtered CPICH SNR is greater than the threshold T, maintain the mode as non-diversity.

8. The method of claim 4, wherein if the mode of the receiver is non-diversity and an updated filtered CPICH SNR is less than or equal to the threshold T, switch the mode to diversity.

9. An apparatus comprising a processor and a memory, the memory containing program code executable by the processor for performing the following:
   estimating received power levels on a first diversity receive branch and a second diversity receive branch in a receiver;
   updating filter states of the first diversity receive branch and the second diversity receive branch based on estimated received power levels and current filter states;
   determining a threshold T based on a power imbalance between the first diversity receive branch and the second diversity receive branch;

determining the power imbalance between the first diversity receive branch and the second diversity receive branch based on updated filtered received power levels on the first diversity receive branch and the second diversity receive branch;

determining a weaker receive branch, wherein the weaker receive branch has lower updated filtered received power levels between the first diversity receive branch and the second diversity receive branch;

determining an intercept parameter for a switching curve, wherein the intercept parameter for the switching curve is indicative of updated filtered received power levels of the second diversity receive branch if the first diversity receive branch is the weaker receive branch; and determining a switching decision for the receiver based on the threshold T.

10. The apparatus of claim 9, wherein the memory further comprises program code for setting an equalizer tap value of zero for the weaker receive branch.

11. The apparatus of claim 9, wherein the memory further comprises program code for estimating a signal-to-noise ratio (SNR) at an equalizer output.

12. The apparatus of claim 11, wherein the SNR is a common pilot channel signal-to-noise ratio (CPICH SNR).

13. The apparatus of claim 12, wherein if a mode of the receiver is diversity and an updated filtered CPICH SNR is less than or equal to the threshold T, maintain the mode as diversity.

14. The apparatus of claim 12, wherein if the mode of the receiver is diversity and an updated filtered CPICH SNR is greater than the threshold T, switch the mode to non-diversity.

15. The apparatus of claim 12, wherein if the mode of the receiver is non-diversity and an updated filtered CPICH SNR is greater than the threshold T, maintain the mode as non-diversity.

16. The apparatus of claim 12, wherein if the mode of the receiver is non-diversity and an updated filtered CPICH SNR is less than or equal to the threshold T, switch the mode to diversity.

17. An apparatus for mitigation of receive power imbalance comprising:

means for estimating received power levels on a first diversity receive branch and a second diversity receive branch in a receiver;

means for updating filter states of the first diversity receive branch and the second diversity receive branch based on estimated received power levels and current filter states;

means for determining a threshold T based on a power imbalance between the first diversity receive branch and the second diversity receive branch;

means for determining the power imbalance between the first diversity receive branch and the second diversity receive branch based on updated filtered received power levels on the first diversity receive branch and the second diversity receive branch;

means for determining a weaker receive branch, wherein the weaker receive branch has lower updated filtered received power levels between the first diversity receive branch and the second diversity receive branch;

means for determining an intercept parameter for a switching curve, wherein the intercept parameter for the switching curve is indicative of updated filtered received power levels of the second diversity receive branch if the first diversity receive branch is the weaker receive branch; and means for determining a switching decision for the receiver based on the threshold T.

18. The apparatus of claim 17 further comprising means for setting an equalizer tap value of zero for the weaker receive branch.

19. The apparatus of claim 17 further comprising means for estimating a signal-to-noise ratio (SNR) at an equalizer output.

20. The apparatus of claim 19, wherein the SNR is a common pilot channel signal-to-noise ratio (CPICH SNR).

21. The apparatus of claim 20, wherein if a mode of the receiver is diversity and an updated filtered CPICH SNR is less than or equal to the threshold T, maintain the mode as diversity.

22. The apparatus of claim 20, wherein if the mode of the receiver is diversity and an updated filtered CPICH SNR is greater than the threshold T, switch the mode to non-diversity.

23. The apparatus of claim 20, wherein if the mode of the receiver is non-diversity and an updated filtered CPICH SNR is greater than the threshold T, maintain the mode as non-diversity.

24. The apparatus of claim 20, wherein if the mode of the receiver is non-diversity and an updated filtered CPICH SNR is less than or equal to the threshold T, switch the mode to diversity.

25. A non-transitory computer-readable medium storing a computer program, wherein execution of the computer program is for:

estimating received power levels on a first diversity receive branch and a second diversity receive branch in a receiver;

updating filter states of the first diversity receive branch and the second diversity receive branch based on estimated received power levels and current filter states;

determining a threshold T based on a power imbalance between the first diversity receive branch and the second diversity receive branch;

determining the power imbalance between the first diversity receive branch and the second diversity receive branch based on updated filtered received power levels on the first diversity receive branch and the second diversity receive branch;

determining a weaker receive branch, wherein the weaker receive branch has lower updated filtered received power levels between the first diversity receive branch and the second diversity receive branch;

determining an intercept parameter for a switching curve, wherein the intercept parameter for the switching curve is indicative of updated filtered received power levels of the second diversity receive branch if the first diversity receive branch is the weaker receive branch; and determining a switching decision for the receiver based on the threshold T.

26. The non-transitory computer-readable medium of claim 25 wherein execution of the computer program is also for estimating a signal-to-noise ratio (SNR) at an equalizer output.

* * * * *